United States Patent [19]
Takenaka

[11] Patent Number: 5,140,183
[45] Date of Patent: Aug. 18, 1992

[54] RUSH CURRENT PREVENTION CIRCUIT

[75] Inventor: Tsutomu Takenaka, Tokyo, Japan

[73] Assignee: Kabushiki Kaisha Toshiba, Kawasaki, Japan

[21] Appl. No.: 578,223

[22] Filed: Sep. 6, 1990

[30] Foreign Application Priority Data

Sep. 29, 1989 [JP] Japan .................. 1-254964

[51] Int. Cl.$^5$ .................. H03K 5/00; G11C 11/00
[52] U.S. Cl. .................. 307/296.4; 307/296.1; 307/296.5; 307/272.3; 307/350
[58] Field of Search .............. 307/296.1, 296.2, 296.3, 307/296.4, 296.5, 272.3, 350

[56] References Cited

U.S. PATENT DOCUMENTS

| | | | |
|---|---|---|---|
| 3,155,847 | 11/1964 | Kirchmier | 307/296.4 |
| 4,249,089 | 2/1981 | Wolford et al. | 307/296.4 |
| 4,288,865 | 9/1981 | Graham | 307/296.4 |
| 4,344,003 | 10/1982 | Harmon et al. | 307/296.4 |
| 4,365,316 | 12/1982 | Iwahashi et al. | 307/296.1 |
| 4,617,473 | 10/1986 | Bingham | 307/362 |
| 4,647,956 | 3/1987 | Shrivastava et al. | 307/296.2 |
| 4,698,530 | 10/1987 | Thomson | 307/296.5 |
| 4,886,983 | 12/1989 | Taka | 307/296.5 |
| 4,902,910 | 2/1990 | Hsieh | 307/296.4 |
| 4,918,331 | 4/1990 | Van Zanten et al. | 307/272.2 |

*Primary Examiner*—Stanley D. Miller
*Assistant Examiner*—Terry D. Cunningham
*Attorney, Agent, or Firm*—Finnegan, Henderson, Farabow, Garrett and Dunner

[57] ABSTRACT

A second circuit to which back-up power is supplied, such as a RAM, is connected downstream of a first circuit to which no back-up power is supplied, such as a CPU. A gate circuit inhibits the output signal of the first circuit to the second circuit and provides a predetermined level to the second circuit when the output signal of the first circuit is at an indefinite level and prevents a penetration current from flowing through the second circuit.

12 Claims, 5 Drawing Sheets

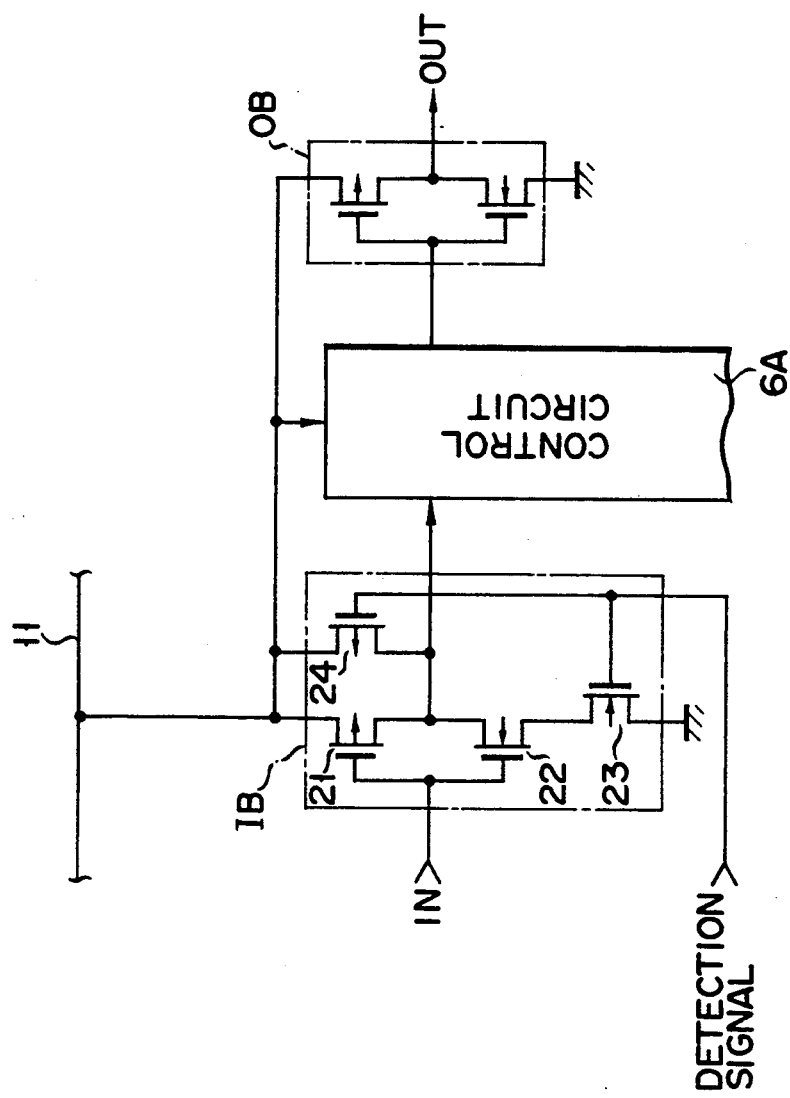
F I G. 3

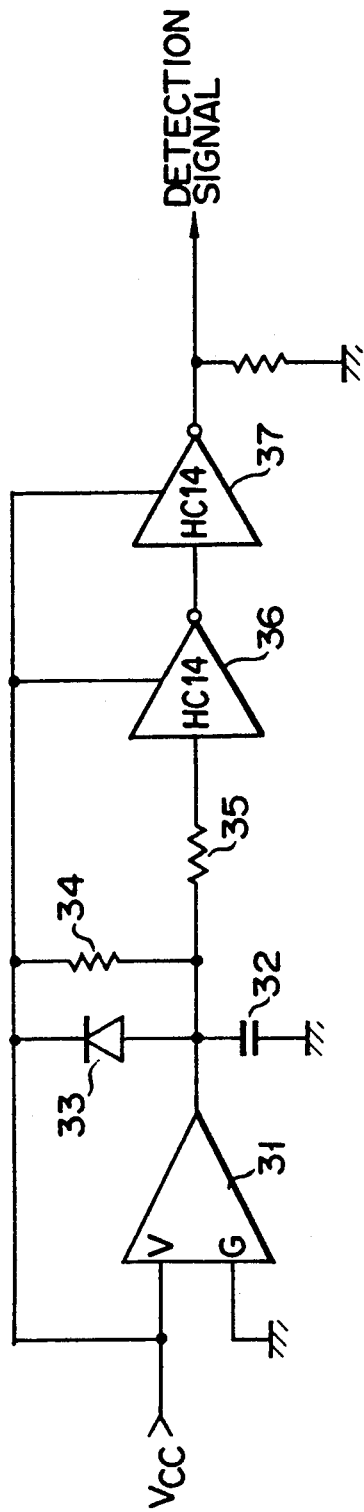
F I G. 4
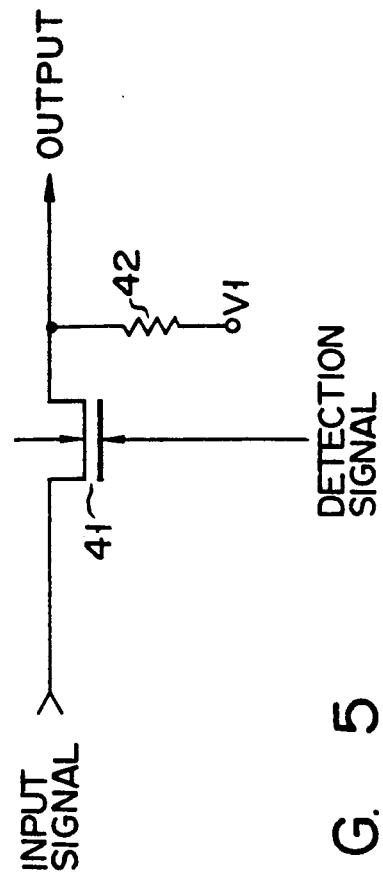
F I G. 5

RUSH CURRENT PREVENTION CIRCUIT

BACKGROUND OF THE INVENTION

1. Field of the Invention

This invention relates to rush current prevention technology and, more particularly, to a technology for prohibiting the production of a penetration current in circuitry when an input signal is at an indefinite level.

2. Description of the Related Art

A system is widely known wherein back-up power is supplied to some circuit such as a memory when the power source is off. In such a system, backed-up circuits and non backed-up circuits coexist in the circuitry and an output signal from the non backed-up circuits goes to an indefinite level when the power source is turned on and off. Where the system is of a type in which an output from the non backed-up circuit is supplied to the backed-up, penetration, surge current or rush current flows through the backed-up circuit when the power source is turned on and off. This increases power consumption of the back-up battery and, hence, shortens a time period available for back-up. Furthermore, rapid changes in current flow decrease the back-up voltage, so that it is likely that a normal back-up voltage is not obtained.

It is known that, when the output signal changes to an indefinite level, a large rush current flows through a CMOS transistor. Therefore, the above drawback become particularly critical where the backed-up circuit is formed of a CMOS transistor.

SUMMARY OF THE INVENTION

This invention has been accomplished with a view to eliminating the above drawback and has as an object to minimize the flow of penetration current through a circuit in which a backed-up circuit and a non backed-up circuit coexist.

Another object of the invention is to minimize the flow of penetration current from a power supply through circuits.

To achieve these objects, the system according to this invention comprises power supply means for outputting circuit driving power, back-up means for outputting back-up power at least when the power supply means is off, first circuit means for being operative upon receipt of the power from the power supply means, second circuit means for being operative upon receipt of the power from the back-up means, and inhibiting means for inhibiting an output signal from the first circuit means from being supplied to the second circuit means when an output signal from the first circuit means is at an indefinite level.

It may happen that an output signal from the non backed-up circuit is rendered to be at an indefinite level after the power supply means is turned on or off. The above arrangement of the invention prevents signals of an indefinite level from being supplied to the circuit to which back-up power is brought in.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. In the drawings.

FIG. 3 shows a circuit diagram showing an example of the arrangement of input and output buffers of the RAM controller shown in FIG. 1;

FIG. 4 is a circuit diagram illustrating one example of the arrangement of the detection circuit shown in FIG. 1;

FIG. 5 is a circuit diagram of a modification of the arrangement of the input buffer shown in FIG. 1.

DETAILED DESCRIPTION OF THE PREFERRED EMBODIMENTS

The system according to one embodiment of this invention will be described with reference to the accompanying drawings.

Figure 1:
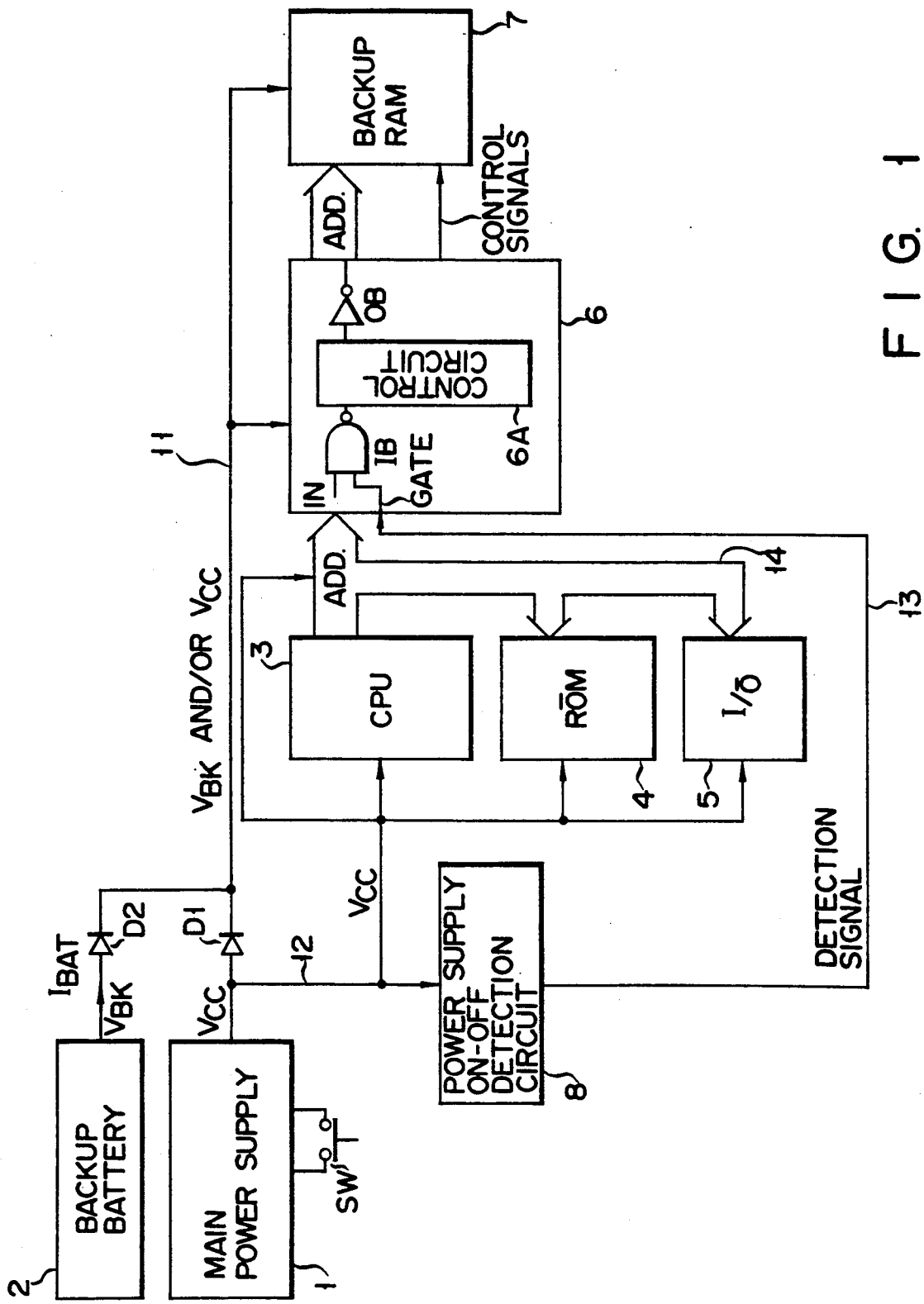
FIG. 1 is a block diagram of the arrangement of the system according to the first embodiment of the invention.

First, the arrangement of the system will be discussed in connection with FIG. 1.

A main power supply 1 is provided with a switch SW and, when it is turned on, supplies operating power of a potential of approximately Vcc to each component of the system. The main power supply 1 is formed by an AC power source, a battery, etc. A backup battery 2 acts as a back-up power supply which brings backup power of a potential of about VBK to a memory, etc. The output terminals of the main power supply 1 and the back-up battery 2 are connected to power lines 11 via reverse current blocking diodes D1 and D2. The output voltage VCC of the main power source 1 is set slightly higher than the output voltage VBK of the back-up battery 2, so that power is fed to the power lines 11 mainly from the main power supply 1 when the switch SW is on, and mainly from the back-up battery 2 when the switch SW is off. The output terminal of the main power supply 1 is also connected to power lines 12.

A CPU (central processing unit) 3, a ROM (read only memory) 4, an I/O port (input/output port) 5 and an address bus 14 are connected to the power lines 12. The address bus 14 transfers address data output from the CPU 3 to the ROM 4, I/O port 5, and to a RAM controller 6 to be described later.

The RAM controller 6 and a RAM 7 are connected to the power lines 11. The RAM controller 6 is constantly operative by receiving power fed through the power lines 11. For example, the RAM controller 6 receives an address signal from the address bus 14 and makes access to the RAM 7 by supplying the address signals and control signals thereto, or generates an address signal by itself and supplies the address signals and control signals to the RAM 7 to effect refreshment thereof. The RAM 7 operates constantly upon feeding of power from the power lines 11 and stores data therein.

The RAM controller 6 comprises input gates IB formed of NAND gates, control circuit 6A and output gates OB formed of inverters. For ease of understanding, only a single input gate IB is shown in FIG. 1. It should be understood, however, that the input gate IB is arranged in a number corresponding to the number of signals that are fed to the RAM controller 6 and the RAM 7 from the CPU 3, ROM 4, I/O port 5, etc. Also, a plurality of output gates are provided. Input signals are fed to one of the input terminals of each input gate IB and detection signals from a detection circuit to be described hereinafter are fed to the other input terminal of the input gate IB. Address data, control signals, etc. output by the RAM controller 6 are supplied to the RAM 7.

The CPU 3, ROM 4, I/O port 5, and the address bus 14, already mentioned, are illustrative of circuits to which no back-up power is supplied. The above mentioned RAM controller 6 and RAM 7 are examples of circuits which are disposed downstream of the circuits to which no back-up power is supplied, and which operate upon receipt of back-up power and signals from circuits located upstream thereof.

The power lines 12 are connected the detection circuit 8 which detects the on/off state of the main power supply 1 and outputs a detection signal of a binary level, which level changes rapidly. The detection signal is fed via a line 13 to the other of the input terminals of the input buffer IB.

The function of the FIG. 1 circuit will be explained with reference to FIGS. 2A to 2D.

Figure 2:
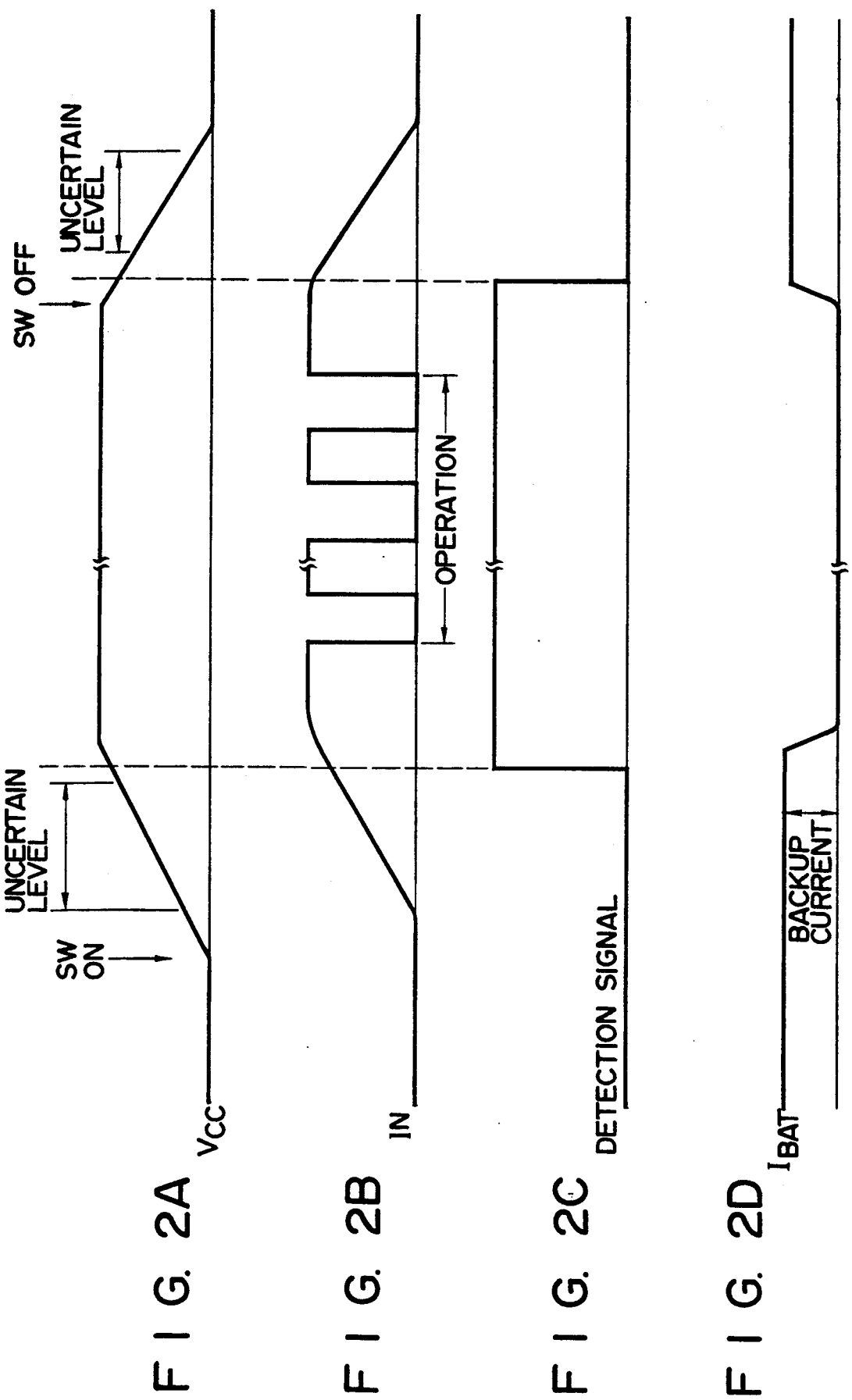
FIGS. 2A to 2D are timing charts of signals from various parts of the circuit shown in FIG. 1.

When the main power supply 1 is off, the output voltage VCC of the main power supply 1 is 0 V as shown in FIG. 2A, so that the CPU 3, ROM 4, I/O port 5, power supply on-off detection circuit 8, and the address bus 14 are inoperative. In contrast, the RAM control circuit 6 and RAM 7 are, as shown in FIG. 2D, supplied with a back-up current IBAT from the back-up battery 2 via the power lines 11. The back-up current IBAT causes the RAM control circuit 6 and RAM 7 to perform predetermined functions, such as refreshment.

When the main power supply 1 is turned on the output voltage thereof gradually rises as shown in FIG. 2A. As a result, the non backed-up circuits, such as the CPU 3 and the address bus 14, are rendered electrically unstable. In other words, the voltage of the input signal (voltage on the bus 14) of, for example, the RAM controller 6 is, as is apparent from FIG. 2B, put into an indefinite state, i.e., into an unstable state where the voltage is neither at a logic "1" level nor a logic "0" level.

On the other hand, the detection circuit 8 starts functioning when the output voltage VCC of the main power supply 1 is still at a low level and, as shown in FIG. 2C, continues to output detection signals of a low level (ground level) until the voltage VC reaches such a level as enables the CPU 3, bus 14, etc. to operate stably. The NAND gates forming the input gates IB are closed in response to the detection signal. Thus, the uncertain level signal from the address bus 14 is inhibited and prevented from being fed to the control circuit 6A. The above arrangement prevents penetration current from flowing through the control circuit 6A and RAM 7, so that the back-up current IBAT is maintained approximately at a constant level as shown in FIG. 2D.

As the output voltage VCC of the main power supply 1 further increases, the CPU 3, bus 14, etc. start normal functions, and an input signal to the RAM control circuit 6 is also at a stable voltage level (of a logic 1 or logic 0).

When the output voltage VCC subsequently reaches the level of a reference voltage, the detection circuit 8 rapidly changes the level of the detection signal into a high level as shown in FIG. 2C, whereby the NAND gates forming the input buffer IB are opened permitting the signal on the bus 14 to be inverted so as to be fed to the control circuit 6A, which then controls the RAM 7 on the basis of the signal received.

As the power supply voltage VCC rises, the current IBAT flowing from the back-up battery 2 to the power lines 11 decreases and terminates as shown in FIG. 2D.

While the main power source 1 is on, the detection signal maintains its high level. The CP 3 drives the bus 14 and, as shown in FIG. 2B, sends, for example, the address signal to the control circuit 6A. The level of the address signal is substantially stable so that no penetration current flows into the control circuit 6A, RAM 7, etc.

On the other hand, when the main power supply 1 is switched off, its output voltage VCC gradually drops as shown in FIG. 2A.

When the voltage VCC decreases to a reference value before the CPU 3 and bus 14 start unstable operation, the detection circuit 8 outputs a detection signal of a low level, in response to which the input gates IB are closed and the address signal on the bus 14 ceases to be fed to the control circuit or chip 6A.

Thereafter, the signal levels of output signal from the CPU 3 and the address signal on the address busses 14 are brought to unstable levels with decrease of the power supply voltage VCC. These unstable level signals are, however, blocked by the NAND gates.

With a drop of the power supply voltage VCC, a supply of current IBAT from the back-up battery 2 to the power lines 11 takes place as shown in FIG. 2D, whereby the RAM controller 6 and RAM 7 continue to operate. On the other hand, circuits to which no back-up power is supplied stop operation.

As has been described above, according to this embodiment, the non backed up circuits 3 and 14 in to this embodiment are located upstream of the circuit 6A which is backed up by the back-up power supply 2. Further, owing to the provision of the input buffer IB, the indefinite-level signal, resulting from turn-on and turn-off of the main power supply 1, is inhibited from being supplied to the backed-up circuit 6A, thus eliminating the known drawback that the back-up current IBAT is rapidly increased immediately after turn-on and turn-off of the power supply (or that surge current is produced). In other words, a rush current prevention circuit is obtained.

One example of the arrangement of the input buffer IB will now be explained with reference to FIG. 3.

FIG. 3 illustrates a specific arrangement of the RAM control circuit. As shown, the input buffer is formed of a first P-type MOS transistor 21, a first N-type MOS transistor 22, a second N-type MOS transistor 23, and a second P-type MOS transistor 24.

The first P-type MOS transistor 21 is connected to the power lines 11 at one end of its current path. The first N-type MOS transistor 22 has a current path connected at one end to the other end of the current path of the first P-type MOS transistor 21. The second N-type MOS transistor 23 is connected at one end of its current path to the other end of the current path of the first N-type MOS transistor 22 and grounded at the other end of its current path. The second P-type MOS transistor 24 has a current path coupled at one end to the one end of the current path of the first P-type MOS transistor 21 and at the other end to the one end of the current path of the first N-type MOS transistor 22.

The first P-type MOS transistor 21 and the first N-type MOS transistor 22 constitute an inverter, and are supplied at respective gates with an input signal coming from the address bus 14. A detection signal is supplied to the gates of the second N-type MOS transistor 23 and the second P-type MOS transistor 24. The current driving ability of the second P-type MOS transistor 24 and the second N-type MOS transistor 23 is greater than that of the first P-type MOS transistor 21 and the first N-type MOS transistor 22.

Voltage at the other end of the current path of the first P-type MOS transistor 21 is supplied as an output of the buffer circuit IB to a circuit (control circuit 6A) located downstream thereof. The input buffer OB shown in FIG. 3 is an inverter circuit of a known type.

The operation of the circuit shown in FIG. 3 will now be explained. Upon receipt of a detection signal of a high level, the second P-type MOS transistor 24 turns off and the second N-type MOS transistor 23 turns on, so that the inverter formed of the transistors 21 and 22 turns on and outputs a signal from the address bus 14 in an inverted form. When a low level detection signal is supplied, the second P-type MOS transistor 24 turns on and the second N-type MOS transistor turns off, so that the output terminal of the input buffer IB is set at a high level, with the result that an input signal of an indefinite level is disabled.

A specific arrangement of the detection circuit 8 will be described in conjunction with FIG. 4.

In the figure, the power supply voltage VCC and ground voltage are applied to an operational amplifier 31. A capacitor 32 is connected between the output terminal of the operational amplifier 31 and ground potential. Between the output terminal of the operational amplifier 31 and the power input terminal thereof is connected a diode 33 for discharging the charge of the capacitor 32 at the power-off time and a resistor 34. The output terminal of the operational amplifier is connected to inverters (HCl4) 36 and 37 cascade connected to each other in two stages, via a resistor 35 for inhibiting the latch-up of a CMOS circuit. Between the output terminal of the inverter 37 and the ground is connected a resistor 38.

The above circuit outputs a high level signal when the power voltage VCC exceeds a predetermined value, for example 4.5 V, and outputs a low level signal when the voltage VCC becomes 4.5 V or less. Gate arrays, Schmitt trigger cells, or the like may be employed for the inverters 36 and 37.

As has been described in detail, the input signal according to this embodiment is gated using a detection signal from the detection circuit 8. Accordingly, even if the input signal is at an indefinite level, a signal of an uncertain level is not input into the backed-up circuit. In other words, no penetration current flows through the backed-up circuit, thus affording back-up function by a battery over a long period of time and avoiding a back-up voltage drop due to a rapid increase in the back-up current.

This invention is not limited to the embodiments described. For example, the arrangement of the input buffer IB is not limited to the one shown in FIG. 3. In FIG. 3, for instance, the transistors to which the input signal and detection signal are fed may be interchanged. In this case, it is preferred that the current driving ability of the transistors 21 and 22 is set to be greater than that of the transistors 23 and 24. Similarly, another circuit arrangement, such as one shown in FIG. 5, is used for the input buffer IB. In FIG. 5, the input signal is supplied to a backed-up circuit through the current path of the MOS transistor 41. The MOS transistor 41 is supplied at its gate with the detection signal with its current path coupled at the other end to the back-up circuit and pulled up or pulled down at a predetermined potential V1 via a resistor. Such arrangement disenables the input signal of an uncertain level to be supplied to the backed-up circuit. The input gate IB need not be formed of a NAND gate. For example, a two-terminal OR gate may be used as the input buffer IB. In this case, a high level detection signal is supplied to the OR gate while the input signal remains at an uncertain level. Further, an optional circuit which is capable of fixing the input signal at a predetermined level while the level of the input signal stays uncertain may be used as the input buffer IB.

Figure 6:
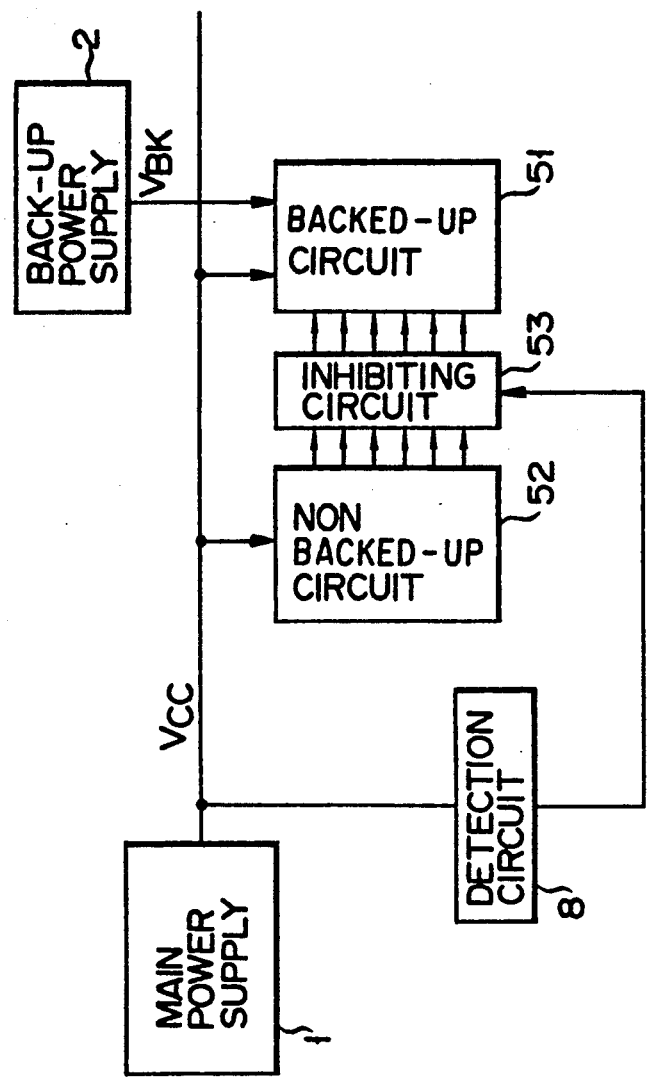
FIG. 6 is a block diagram showing another embodiment according to this invention.

This invention is not limited to computer devices. For example, the invention is for a wide range of circuitry in which both a backed-up circuit 51 and a non backed-up circuit 52 exist as shown in FIG. 6. During a period of unstability of the power-supply voltage, transmission of signals (output signals, control signals, data, addresses, etc.) from the non backed-up circuit 52 to the backed-up circuit 51 is inhibited by the inhibiting circuit 53. According to the preceding embodiment, diodes are used as reverse current blocking circuits of the back-up battery 2. The invention is not limited thereto. For example, elements, such as FETs or transistors may be used instead.

The arrangement of the detection circuit is not limited to the one described in connection with the foregoing embodiments. For example, the detection signal may be generated in the main power supply. Further, it may be generated manually prior to turn-on and turn-off of the main power supply. Still alternatively, a transient contact or intermediate contact may be set up in the main power supply, so that the generation of a detection signal is accomplished by using a signal from such transient or intermediate contact. In a computer, etc. where a CPU is used exclusively for the control of power supply, the main power supply may be turned on or off after the level of detection signals has been set.

Detection signals need not be generated by measuring the magnitude of the power supply voltage VCC. For example, turn-on and turn-off of the power supply switch may trigger calculating setting a predetermined period of time to spend, to inhibit unstable-level signals from flowing through a backed-up circuit for such set period of time during which it is anticipated that the power supply voltage will be at an unstable level.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A system comprising:
    power supply means for outputting a circuit driving output voltage;

ON/OFF means for turning said power supply means on and off;

back-up means for outputting a back-up voltage at least when said power supply means remains off;

first circuit means for being driven upon receipt of said circuit driving output voltage, and for outputting an output signal;

second circuit means for being driven upon receipt of said circuit driving output voltage and said back-up voltage, and for receiving said output signal; and inhibiting means for receiving said output voltage, detecting whether said output voltage is in an indefinite range between 0 and a predetermined level, and inhibiting said output signal from being received by said second circuit means when said output voltage is in the indefinite range.

2. The system according to claim 1, in which said inhibiting means comprises signal supply means, connected between said first circuit means and said second circuit means, for supplying said output signal to said second circuit means as an input signal in a normal state when the output signal is not in the indefinite range, and providing a predetermined signal level to the second circuit means when said output voltage is in the indefinite range.

3. The system according to claim 2, wherein said signal supply means comprises:

a gate circuit including a first input terminal which receives said input signal and a second input terminal which receives a detection signal; and wherein said inhibiting means further includes voltage detection means for outputting said detection signal which sets an output of said gate circuit at said predetermined signal level when said output voltage is in the indefinite range.

4. The system according to claim 3, in which said gate circuit includes NAND gates.

5. The system according to claim 2, in which said setting means comprises a gate circuit;

the gate circuit comprising:

a first MOS transistor of a first conductivity type having a current path receiving at one end a first potential;

a first MOS transistor of a second conductivity type having a current path connected at one end to the other end of said current path of said first MOS transistor of a first conductivity type;

a second MOS transistor of said second conductivity type having a current path connected at one end to the other end of said current path of said first MOS transistor of a second conductivity type, and applied at the other end a second potential; and a second MOS transistor of said first conductivity type having a current path connected at one end to said one end of said current path of said first MOS transistor of a first conductivity type and at the other end to said one end of said current path of said first MOS transistor of a second conductivity type;

gates of said first MOS transistor of a first conductivity type and of said first MOS transistor of a second conductivity type being supplied with said input signal or a detection signal;

gates of said second MOS transistor of said second conductivity type and of said second MOS transistor of said first conductivity type being supplied with the one of either said input signal or said detection signal not supplied to the gate of said first MOS transistor of a first conductivity type; and said setting means further comprises:

voltage detection means for outputting said detection signal, said detection signal setting an output from said gate circuit at said predetermined signal level when said output voltage is in the indefinite range.

6. The system of according to claim 5, in which said first potential is either the output back-up voltage of said back-up means or said output voltage of the power supply means;

said second potential is ground potential; and said first conductivity type is a P-type and said second conductivity type is an N-type.

7. The system according to claim 5, further comprising means for selectively applying one of said output voltage of said power supply means and said output back-up voltage of said back-up means to said second circuit means.

8. The system according to claim 2, in which said second circuit means is formed of a CMOS circuit.

9. A system comprising:

first power supply means for outputting an output voltage;

ON/OFF means for turning said first power supply means on and off;

second power supply means for outputting a back-up voltage, at least when said first power supply means is off;

circuit means for being driven upon receipt of the output voltage from said first power supply means and the back-up voltage from said second power supply means, and for receiving an input signal; and means, receiving said output voltage and the input signal, for detecting the level of the output voltage which supplies a predetermined signal level to the circuit means when the output voltage is less than a predetermined reference voltage value and supplies the input signal to the circuit means when the output voltage is equal to or greater than the predetermined reference voltage value.

10. The system according to claim 9, in which said receiving means includes means for generating a detection signal in response to said detection, and includes a gate circuit having a first input terminal which receives said input signal and a second input terminal which receives said detection signal.

11. A system comprising:

first power supply means for outputting an output voltage;

ON/OFF means for turning said first power supply means on and off;

second power supply means for outputting a back-up voltage at least when said first power supply means is off;

first circuit means for being driven upon a receipt of said output voltage from said first power supply means and for outputting an output signal;

second circuit means for receiving said output voltage from said first power supply means, said backup voltage from said second power supply means, and said output signal from said first circuit means, and being driven in response to said output signal; and means, receiving said output voltage and the output signal of the first circuit means, which detects the level of the output voltage for supplying said output signal to said second circuit means when said output voltage is equal to or higher than a predetermined reference voltage value, and for supplying a specific signal level to the second circuit means when said output voltage is lower than said predetermined reference voltage value.

12. The system according to claim 11, in which said receiving means comprises a gate circuit including:
- a first MOS transistor of a first conductivity type having a current path receiving at one end either the output of said power supply means or said second back-up means;
- a first MOS transistor of a second conductivity type having a current path connected at one end to the other end of said current path of said first MOS transistor of a first conductivity type;
- a second MOS transistor of said second conductivity type having a current path receiving at one end a ground potential; and
- a second MOS transistor of said first conductivity type having a current path connected at one end to said one end of said current path of said first MOS transistor of a first conductivity type and at the other end to said one end of said current path of said first MOS transistor of a second conductivity type;
- gates of said first MOS transistor of a first conductivity type and of said first MOS transistor of a second conductivity type being supplied with said input signal and a detection signal;
- gates of said second MOS transistor of said second conductivity type and of said second MOS transistor of said first conductivity type being supplied with the one of either said input signal or said detection signal not supplied to the gate of said first MOS transistor of a first conductivity type; and wherein
- said receiving means further comprises voltage detection means for outputting said detection signal which sets an output from said gate circuit at said specific signal level when said output voltage is less than said predetermined value.

* * * * *

UNITED STATES PATENT AND TRADEMARK OFFICE
CERTIFICATE OF CORRECTION

PATENT NO. : 5,140,183
DATED : August 18, 1992
INVENTOR(S) : Tsutomu Takenaka

It is certified that error appears in the above-identified patent and that said Letters Patent is hereby corrected as shown below:

Claim 6, column 8, line 8, after "system" delete "of".

Claim 11, column 8, line 57, after "upon" delete "a".

Claim 12, column 9, line 12, before "back-up" delete "second".

Claim 12, column 10, line 8, after "signal" change "and" to --or--.

Signed and Sealed this

Twenty-sixth Day of October, 1993

BRUCE LEHMAN

Attest:

Attesting Officer        Commissioner of Patents and Trademarks